United States Patent [19]
Lee et al.

[11] 3,872,008
[45] Mar. 18, 1975

[54] DISPOSABLE FILTER UNIT

[76] Inventors: Wilbur W. Lee, 43 Achcia Dr., Orinda, Calif. 94563; William A. Lee, 1024 Second St., Lafayette, Calif. 94549; Robert D. Lee, 43 Acacia Dr., Orinda, Calif. 94563

[22] Filed: Sept. 7, 1973

[21] Appl. No.: 395,271

[52] U.S. Cl. ............................... 210/232, 210/439
[51] Int. Cl............................................ B01d 27/08
[58] Field of Search .......... 210/130, 232, 238, 435, 210/439, 445, 446, 460, 510, 541

[56] References Cited
UNITED STATES PATENTS

| | | | |
|---|---|---|---|
| 2,750,048 | 6/1956 | Hilbish | 210/232 |
| 3,002,870 | 10/1961 | Bergarte et al. | 210/446 X |
| 3,043,436 | 7/1962 | Larrey | 210/439 X |
| 3,317,045 | 5/1967 | Dummler | 210/435 X |
| 3,405,805 | 10/1968 | Hatter | 210/439 X |
| 3,471,019 | 10/1969 | Trasen et al. | 210/445 |
| 3,487,942 | 1/1970 | Lee et al. | 210/439 |
| 3,494,466 | 2/1970 | Rose et al. | 210/446 X |
| 3,542,202 | 11/1970 | Ball | 210/232 |
| 3,701,433 | 10/1972 | Krakauer et al. | 210/446 X |
| 3,765,537 | 10/1973 | Rosenberg | 210/446 |

*Primary Examiner*—Theodore A. Granger
*Attorney, Agent, or Firm*—Jack M. Wiseman

[57] ABSTRACT

A disposable filter unit in which a housing comprises confronting, cup-shaped sections arranged for sealing juncture at their contiguous annular flanges. Contained by the housing is a filter element in the form of a roll of compressible fabric wound on a compressible core. The roll of compressible fabric is slightly greater axially than the inner axial dimension of the housing and the radial dimension of the roll of compressible fabric is such as to fit snugly within the housing. When the cup-shaped sections of the housing are moved toward one another in the axial direction to bring the annular flanges thereof in sealing engagement, the roll of compressible fabric is compressed axially. This action causes the roll of compressible fabric to expand radially and thereby causing the housing to exert a compressive radial force against the roll of compressible fabric. Thus, fluid to be filtered is inhibited from by-passing the filter element. The annular flanges of the cup-shaped sections for the housing are permanently sealed by sonic welding, heat sealing or through the use of adhesives.

1 Claim, 3 Drawing Figures

PATENTED MAR 18 1975 3,872,008

DISPOSABLE FILTER UNIT

BACKGROUND OF THE INVENTION

The present invention relates in general to filter units and more particularly to a fluid filter unit for submicronic filtration.

In pollution control, there is a need for a fluid filter unit to provide submicronic filtration with relatively high flow rates. Such a fluid filter unit should be inexpensive, disposable, and highly efficient. A typical application of such a fluid filter unit would be in the quality control analysis of water released from industrial plants. In such an application, it is desirable to remove all suspended solids from the water prior to making an analysis for dissolved solids. It is important in such an application that the fluid filter unit be disposable so that a new filter unit may be made available for each test. This reduces the possibility of an erroneous analysis that can be caused by residual contamination remaining in a conventional filter housing even after the installation of a new replacement filter element.

Hertofore, oil filter units were designed with housings in which an axial compressive force was applied to a roll of paper tissue causing a radial compressive to be applied to the roll of paper tissue by the housing. In the patent to W. W. Lee et al., U.S. Pat. No. 3,487,942; the patent to Hilbish, U.S. Pat. No. 2,750,048; and in the patent to William J. Dummler, U.S. Pat. No. 3,317,053, is disclosed such an oil filter. It has been found, however, that a roll of paper tissue as the filtering element is not adequately effective for the entrapment of suspended submicronic solid particles from an aqueous fluid.

Filter elements have been known to be made of porous fabric, terry cloth, towels, cotton cloth, burlap, cloth over paper, and cotton waste. Disclosures thereof may be found in the patent to Hyatt, U.S. Pat. No. 425,431; patent to Koser, U.S. Pat. No. 2,973,991; patent to Bennett, U.S. Pat. No. 2,995,254; patent to Babitch, U.S. Pat. No. 1,761,963; patent to Reed, U.S. Pat. No. 2,086,739; and Canadian patent to Kennedy, No. 481,975. Such filter units, however, are not adequately efficient for the entrapment of suspended submicronic solid particles from aqueous fluids at the desired relatively high flow rate.

Other patents of interest are:

| | | |
|---|---|---|
| Blomquist | No. 3,173,868 | |
| Sokolik | No. 2,777,759 | |
| Krieck | No. 2,106,218 | |
| Kuraoka | No. 702/1960 | (Japanese Utility Model Publication Number) |

SUMMARY OF THE INVENTION

A disposable filter unit in which a container comprises cup-shaped sections arranged for sealing juncture at their lips. A roll of plastic fabric is disposed in the housing. The roll of plastic fabric has an axial dimension slightly greater than the inner axial dimension of the housing. The radius of the roll of plastic fabric is of such a dimension that the roll of plastic fabric fits snugly within the housing. When the lips of the cup-shaped sections of the housing are brought into sealing engagement, the roll of plastic fabric is compressed axially causing the housing to compress the roll of plastic fabric radially.

A feature of the present invention is that the lips of the cup-shaped sections of the housing are fixedly sealed together and to the compressed element to reduce the possibility of fluid by-passing the filter element.

By virtue of the present invention, a fluid filter unit is provided that removes efficiently the suspended submicronic solid particles, suspended solids from liquids, oil vapor from compressed gases and the like. The fluid filter unit is inexpensive, disposable and highly efficient. It provides submicronic filtration with relatively high flow rates.

By having a disposable filter unit, the possibility of an erroneous analysis in a quality control analysis for industrial plants is reduced. Whereas in a conventional housing, residual contamination after the replacement of a filter element could result in an erroneous analysis. By exerting a radial compressive force on a roll of plastic fabric by the housing of the filter unit, the possibility of fluid by-passing the filter element is reduced. The fluid is forced to pass between the layers of the rolled plastic fabric for the axial length of the roll and the interlocking fibers on the surfaces of the compressed layers provide a labyrinth of submicronic openings which effectively entrap the suspended solid particles.

DETAILED DESCRIPTION OF THE PREFERRED EMBODIMENT

Figure 1:
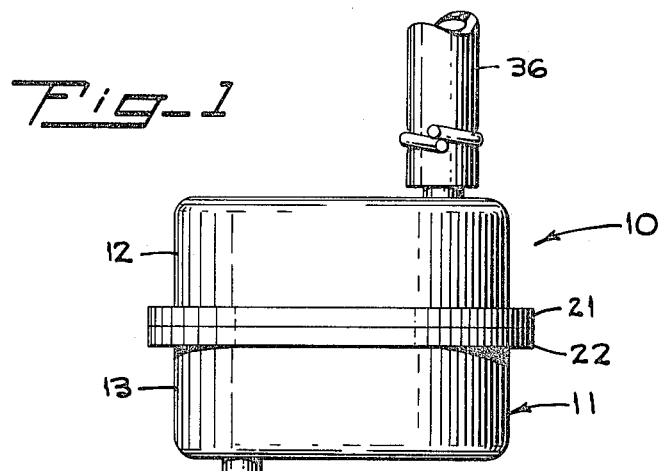
FIG. 1 is a side elevation of the disposable fluid unit embodying the present invention.
Figure 2:
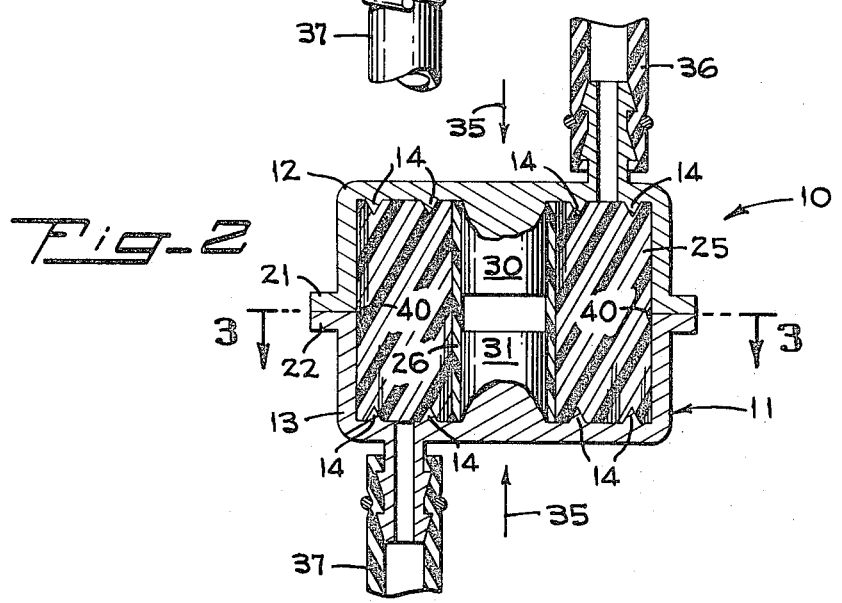
FIG. 2 is a central vertical axial section of the disposable fluid filter unit shown in FIG. 1.
Figure 3:
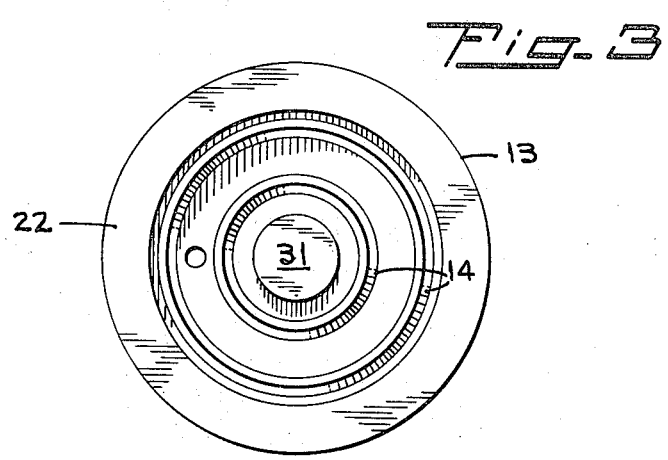
FIG. 3 is a horizontal section of the filter unit taken along line 3—3 of FIG. 2 to illustrate the annular rings at the end walls of the housing.

Illustrated in FIGS. 1 and 2 is a disposable fluid filter unit 10 embodying the present invention. The fluid filter unit 10 comprises a rigid housing 11. In the exemplary embodiment, the rigid housing 11 is formed from the molding of plastic or the casting of metal. The rigid housing 11 includes confronting cup-shaped sections 12 and 13. The flat end walls of the housing 11 have formed therein inwardly directed V-shaped annular rings 14. At the lips of the confronting cup-shaped sections 12 and 13, the cylindrical walls of the cup-shaped sections 12 and 13 are provided with mating annular flanges 21 and 22, respectively.

Disposed within the housing 11 is a roll 25 of woven or non-woven plastic fabric (FIG. 2). In the preferred embodiment, the roll 25 of plastic fabric is a spun bonded non-woven polyester, polyolefin, or polypropylene. It has been found that polypropylene fabric, when used as the filtering element, enables greater absorption of oil vapors and other hydrocarbons from compressed gases. The V-shaped annular rings 14 at the flat end walls of the housing 11 serve to provide areas of extra compressive engagement with the filtering element 25 that will seal the filtering element 25 at the points of engagement with the housing to reduce the possibility of by-pass of the filter element 25. The roll 25 of plastic is wound around a compressible core 26, such as a plastic core. The end walls of the housing 11 exert a slight axial compressive force on the core 26 to provide an additional seal to reduce the possiblity of fluid by-passing the filter element 25. Tubular members 30 and 31 are tapered inwardly at an angle of preferably 2° from the flat end walls of the housing 11 so as to exert a compressive force on the inside diameter of the core 26 to provide an additional seal.

The axial dimension of the roll 25 of plastic fabric is slightly greater than the inner axial dimension of the housing 11. The radial dimension of the roll 25 of plastic fiber fits snugly within the housing 11.

Concentrically within the cup-shaped sections 12 and 13 are similar integrally formed tubular members 30 and 31. The tubular members 30 and 31 project inwardly from the flat end walls of the cup-shaped sections 12 and 13, respectively, and terminate in spaced relation when the cup-shaped sections 12 and 13 are in sealing engagement (FIG. 2). The tubular members 30 and 31 are tapered inwardly at preferably 2° from the flat end members and are dimensioned to receive telescopically thereover the compressible plastic core 26 of the roll 25 of plastic fabric. The tubular members 30 and 31 inhibit the collapse of the plastic core 26 and provide an additional seal when fluid pressure is applied to the filter unit 10.

While the cup-shaped sections 12 and 13 are apart, the roll of plastic fabric 25 is placed therebetween. Thereupon, the cup-shaped sections are urged toward one another in the axial direction as shown by arrows 35. Upon the application of axial force, the lips 21 and 22 of the housing 11 are brought together in sealing engagement. In so doing, the roll of plastic fabric 25 is compressed axially causing the roll 25 of plastic to expand and to be compressed radially thorugh the rigid housing 11. In this manner, the possibility of fluid by-passing the filter element 25 is reduced. The fluid is forced to pass between the layers of the rolled plastic fabric for the axial length of the filtering element 25 and the interlocking fibers or the surfaces of the compressed layers provide a labyrinth of submicronic openings that will effectively entrap the suspended solid particles to be filtered from the fluid.

The annular flanges 21 and 23 of the housing 11 are fixedly joined and sealed by sonic welding, heat sealing, through the use of adhesives and the like. When the lips 21 and 22 are fixedly sealed together and to the compressible roll 25 of plastic fabric at weldment bead 40 by sonic welding, a further more effective seal is provided to further reduce the possibility of fluid by-passing the filter element 25. A suitable fluid inlet connector 36 is formed on the cup-shaped section 12 and a suitable fluid outlet connector 37 is formed on the cup-shaped section 13. Thus, fluid under pressure enters the housing 11 through the connector 36 and is forced to pass between the layers of the roll 25 of plastic fabric for the axial length thereof. The fluid under pressure is discharged or removed from the housing 11 through the outlet connector 37.

We claim:
1. A fluid filter comprising:
   a. a housing having confronting generally cup-shaped sections, said cup-shaped sections being arranged for sealing juncture at their lips;
   b. a roll of compressible material disposed within said housing, said roll of compressible material having an axial length slightly greater than the inner axial dimension of said housing and having a radius of a dimension to fit tightly within said housing, the movement of said cup-shaped sections toward one another in the axial direction compressses said roll of compressible material axially causing said roll of compressible material to be compressed radially through said housing,
   c. said lips of said cup-shaped sections being fixedly sealed together and to said roll of compressible material to reduce fluid by-passing said roll of compressible material,
   d. said housing being formed with annular rings on the inner end walls thereof for additionally compressing said roll of compressible material to reduce fluid by-passing said roll of compressible material,
   e. said roll of compressible material being wound on a compressible core;
   f. oppositely directed tapered tubular sections disposed axially from said inner end walls of said housing for receiving said compressible core telescopically thereover and to engage said compressible core to exert a compressive force thereon for reducing fluid by-passing said roll of compressible material, said tapered tubular members terminate in spaced relation when said lips of said cup-shaped sections are sealed together;
   g. an inlet connector on one of said cup-shaped sections at the upstream side of said housing; and
   h. an outlet connector on the other of said cup-shaped sections at the downstream side of said housing, whereby the fluid enters said housing at said inlet connector, flows through said roll of compressible material and is discharged from said housing through said outlet connector.

* * * * *